United States Patent [19]
Teruya et al.

[11] Patent Number: 5,626,995
[45] Date of Patent: May 6, 1997

[54] METHOD FOR MANUFACTURING LIQUID CRYSTAL DISPLAYS

[75] Inventors: Mayumi Teruya, Tokyo; Hideo Takano, Atugi; Yukito Saitoh; Hiroyuki Kamiya, both of Sagamihara; Masaki Hasegawa, Kamakura, all of Japan

[73] Assignee: International Business Machines Corporation, Armonk, N.Y.

[21] Appl. No.: 520,796

[22] Filed: Aug. 30, 1995

[30] Foreign Application Priority Data

Aug. 30, 1994 [JP] Japan .................. 6-205720

[51] Int. Cl.$^6$ .............. C09K 19/00; G02F 1/03; G02F 1/1337
[52] U.S. Cl. .................. 430/20; 349/124
[58] Field of Search .................. 430/20; 359/58, 359/60, 75, 76, 78

[56] References Cited

U.S. PATENT DOCUMENTS 5,188,870  2/1993  Brosig .................. 359/78

FOREIGN PATENT DOCUMENTS

| 0368204 | 5/1990 | European Pat. Off. | 359/76 |
| 59-37526 | 3/1984 | Japan | 430/20 |
| 61-32818 | 2/1986 | Japan | 430/20 |
| 62-275222 | 11/1987 | Japan | 430/20 |
| 63-110424 | 5/1988 | Japan | 359/78 |
| 64-9422 | 1/1989 | Japan | 359/76 |
| 1-200330 | 8/1989 | Japan | 359/76 |
| 2-228630 | 9/1990 | Japan | 359/76 |
| 6-75229 | 3/1994 | Japan | 359/78 |
| 2244566 | 12/1991 | United Kingdom | 359/76 |

Primary Examiner—Glenn A. Caldarola
Assistant Examiner—J. Pasterczyk
Attorney, Agent, or Firm—David Aker; Jay P. Sbrollini

[57] ABSTRACT

A soluble polyimide solution is applied to the color filter substrate and the TFT substrate of a liquid crystal display. The lower half of the pixels in the color filter substrate and the upper half of the pixels in the TFT substrate are dried by heating by irradiating it with a laser beam. The remaining sections are thereafter dried naturally. The pretilt angle of the molecules of the liquid crystal material in contact with the sections dried by heating with the laser beam is small and the pretilt angle of the molecules which are in contact with the section dried naturally is large, enabling the viewing angle to be widened.

7 Claims, 6 Drawing Sheets 5,626,995

METHOD FOR MANUFACTURING LIQUID CRYSTAL DISPLAYS

FIELD OF THE INVENTION

The present invention relates to a liquid crystal display and, more particularly, to providing a liquid crystal display with a wide viewing cone.

PRIOR ART

A variety of methods have been proposed to obtain a wide viewing cone in a liquid crystal display. In one approach the pixels are divided into two regions and the tilt angles are set asymmetrically in those two regions so that the liquid crystals of these two regions show different orientations from each other.

As shown in the sectional drawing of FIG. 10, in this liquid crystal display, in the left portion of the pixel 100, a small value has been set for pretilt angle φ of a liquid crystal molecule 105 which is in contact with the orientation film 104 of the upper substrate 102 and a large value has been set for pretilt angle φ of a liquid crystal molecule 105 which is in contact with the orientation film 108 of the lower substrate 106 In the right portion of the pixel 100, a large value has been set for pretilt angle φ of a liquid crystal molecule 105 which is in contact with the orientation film 104 of the upper substrate 102 and a small value has been set for pretilt angle φ of a liquid crystal molecule 105 which is in contact with the orientation film 108 of the lower substrate 106.

In the left portion of the pixel 100, the tilt direction of the liquid crystal molecule 105 on the orientation film 108 side where tilt angle φ of the liquid crystal molecule 105 is large is predominant.

In the right portion of the pixel 100, the tilt direction of the liquid crystal molecule 105 on the orientation film 104 side where tilt angle φ of the liquid crystal molecule 105 is large is predominant.

There are several methods to partially change the tilt angle of liquid crystal molecules: One method is to irradiate ultraviolet rays onto the portion where the orientation is to be changed using one orientation film (e.g., the method disclosed in PUPA No. 6-148641, and another method is that the tilt angle of liquid crystal molecules is changed by the use of different orientation films having different tilt angles (e.g., the method disclosed in PUPA No. 5-188374).

In fabricating the liquid crystal display shown in FIG. 10, a polyimide solution is applied to the substrate and heated until the polyimide solution is solidified completely to form orientation films 104 and 108. After that, the left side of the polyimide orientation film 104 and the right side of the polyimide orientation film 108 are irradiated with ultraviolet rays to change the characteristics of the surface so that pretilt angle φ of the liquid crystal molecules is smaller than that of the sections not irradiated by ultraviolet rays. Moreover, after the irradiation by the ultraviolet rays, the orientation films 104 and 108 are rubbed in the specified direction.

In this way, larger viewing angle characteristics are obtained for the pixels 100 because the good visual angle in these two regions are opposite each other.

There are, however, problems in the ultraviolet irradiation method in that the orientation state is unstable because the polymer chain of the polyimide orientation film is forcibly cleaved or bridged by ultraviolet rays. Moreover, it is a fact that it is difficult to control the tilt angle by the irradiation with ultraviolet rays.

The method using different orientation films also has problems that result from the fabrication of the films e.g.,
flickering occurs in the electrical characteristic of the liquid crystal display because different orientation films are used.

Soluble polyimide is dissolved by a solvent to prepare a soluble polyimide solution, this soluble polyimide solution is applied to the substrate with a constant thickness, the substrate is heated by a hot plate, etc., and the polyimide orientation film is obtained by evaporating the solvent. However it is difficult to evaporate the soluble polyimide solution applied to the substrate while maintaining the identical temperature in all parts. Differences in the temperature will occur between the peripheral section and the center section due to the difference in heat transfer, heat divergence, etc.

Problems occur in half tone displays in the section at a high temperature and if the heating temperature of the polyimide varies from one location to another. It was found that the pretilt angle of the liquid crystal varies with the heating temperature. As a result the direction of the development of liquid crystal displays has been towards the use of soluble polyimide in which the change in the pretilt angle with variations of the polyimide firing temperature is smaller.

SUMMARY OF THE INVENTION

In accordance with the present invention, the variation in the pretilt angle of the liquid crystal material in display screens with the curing temperature of the polyimide orientation layers of the screen is used to advantage to provide a liquid crystal display screen with a wide viewing angle. The areas of the substrates defining each pixel of the display screen are divided into sections and the liquid polyimide on the substrates in those sections are cured at different temperatures and the substrates are aligned so the polyimide in opposing surfaces of the same section are fired at a different temperature establishing different pretilt angles for the liquid crystal in each section to obtain the large cone of visibility.

Therefore it is an object of the present invention to provide an improved liquid crystal display.

Another object of the present invention is to provide a method for manufacturing a liquid crystal display using a soluble polyimide whose pretilt angle is varied by the heating temperature in which a liquid crystal display having a wide angle of visibility can be manufactured effectively by partially changing the heating temperature.

A further object of the present invention is to use the variation in pretilt angle of liquid crystal with the cure temperatures of the polyimide orientation films to provide improved liquid crystal displays.

BRIEF DESCRIPTION OF THE DRAWINGS

Those and other objects of the present invention can best be understood by reading the accompanying description of embodiments of the invention while referring to the accompanying figures of which:

FIG. 9 (B) is a sectional view of the heater, TFT substrate, and mask, showing the location of the mask when the soluble polyimide solution applied to the TFT substrate is dried by heating.

DETAILED DESCRIPTION OF THE PREFERRED EMBODIMENTS

Figure 1:
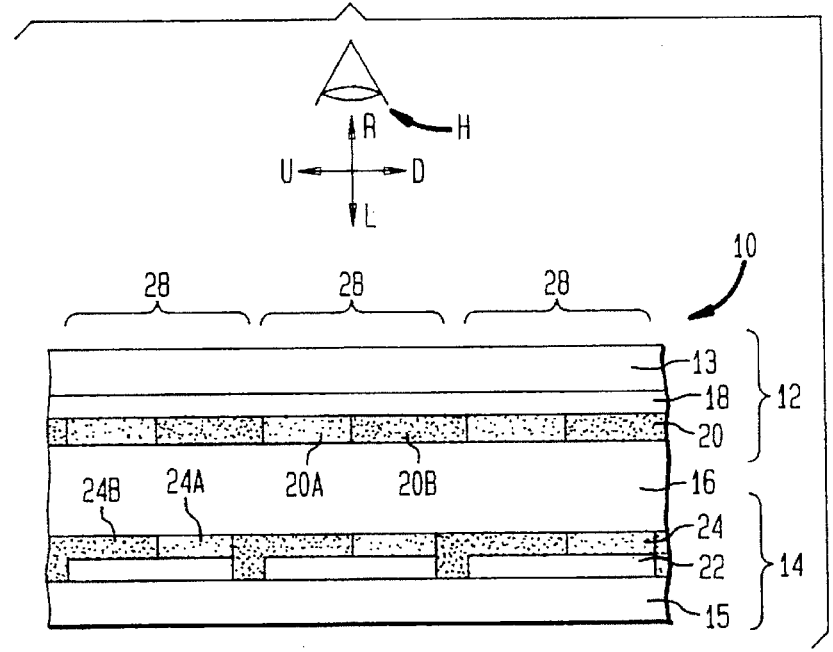
FIG. 1 is a sectional view of the liquid crystal display manufactured according to the method for manufacturing a liquid crystal display of the embodiment.

A liquid crystal display 10 of one embodiment of what is called an active matrix liquid crystal display that has a rectangular shape with a diagonal of 10 inches (640×480 pixels). As shown in the sectional views in FIGS. 1 and 2, nematic liquid crystal 16 is injected in the space between a color filter substrate 12 and a TFT substrate 14.

In the color filter substrate 12, a color filter (not shown) is formed on the inner surface of the glass substrate 13, a plurality of common electrodes 18, such as ITO film, are formed on the color filter, and a polyimide orientation film 20 comprised of segments 20A and 20B is formed on the common electrodes 18.

On the TFT substrate 14, a plurality of pixel electrodes 22 and a well-known TFT element (not shown) are formed on the inner surface of the glass substrate 15 and a polyimide orientation film 24 comprised of segments 24A and 24B is formed on the pixel electrodes 22.

As shown in FIG. 1, this liquid crystal display 10 is arranged such that light is transmitted from the TFT substrate 14 side and an observer looks at the display from the color filter substrate 12 side. In FIGS. 1 to 5 and 9, arrow L shows the left-hand direction when observer H looks at the liquid crystal display 10 in a normal position, arrow R shows the right-hand direction when observer H looks at the liquid crystal display 10 in a normal position, arrow D shows the downward direction when observer H looks at the liquid crystal display 10 in a normal position, and arrow U shows the upward direction when observer H looks at the liquid crystal display 10 in a normal position.

Figure 3:
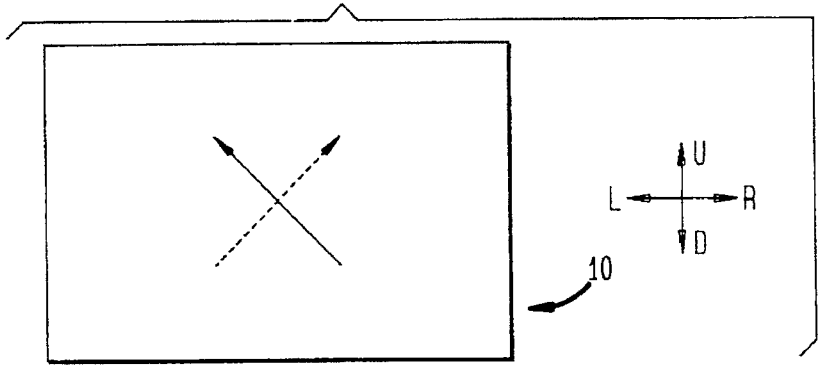
FIG. 3 is a top view, showing the rubbing direction, viewed from the color filter side of the liquid crystal display.

As shown in FIG. 3, in this liquid crystal display 10, when it is looked at from the color filter substrate 12 side, the orientation film 20 of the color filter substrate 12 is rubbed in the upper left direction, as shown by the solid line in FIG. 3, and the orientation film 24 of the TFT substrate 14 is rubbed in the upper right direction crossing the rubbing direction of the orientation film 20, as shown by the broken line in FIG. 3.

Figure 2:
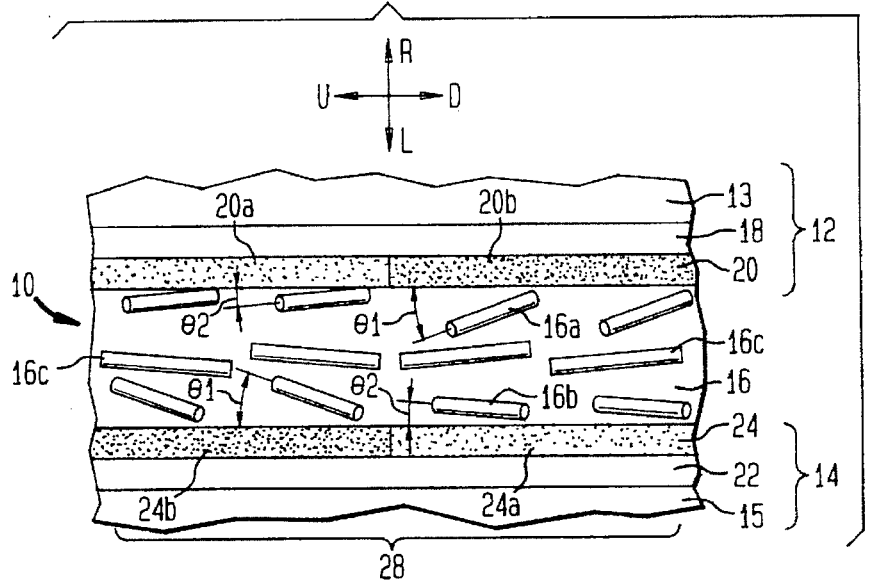
FIG. 2 is an enlarged sectional view of the pixel section.

As shown in FIG. 2, in this liquid crystal display 10, the pretilt angle of the molecules of the liquid crystal layer 16 in the upper half U is different from that in the lower half D with the boundary between them being the center line CL of the pixel 28. In the lower half D, the pretilt angle $\phi 2$ of the molecule 16A of the liquid crystal 16 which is in contact with the orientation film segment 20B of the color filter substrate 12 in the lower half of the pixel 28 is about 8° and pretilt angle 1 of that in the lower half of the pixels 28 is about 8°. Pretilt angle $\phi 2$ of molecule 16B in contact with the orientation film 24 of the TFT substrate 14 in the lower half is about 5°. In the upper half U the opposite is true. The difference ($\phi 1 - \phi 2$) in the pretilt angles is therefore about 3°, but a wide viewing cone can be obtained with the difference in the pretilt angles between about 2° to 10°.

The molecules 16C in the center in the liquid crystal layer are influenced by the molecule 16A the pretilt angles $\phi 1$ and $\phi 2$ and are pretilted towards each other in the upper half U and lower half D of the pixels 28 to increase the size of the viewing cone in the vertical direction.

Next, the method for manufacturing the liquid crystal display 10 according to the embodiment will be explained.

Soluble polyimide is used for the orientation films 20 and 24 in the embodiment. It was found that, when this soluble polyimide is dissolved by a solvent to prepare a soluble polyimide solution and this soluble polyimide is applied to the substrate with a predetermined thickness, e.g., 600 angstroms, if the soluble polyimide is dried quickly by heating at about 85° C., for example, the pretilt angle of the molecule 16A of the liquid crystal 16 becomes about 5°, and if dried at room temperature, e.g., 24° C., the pretilt angle becomes about 8°.

First, a soluble polyimide solution is applied to the active element (not shown) side of the TFT substrate 14 with a thickness of 600 angstroms. The application of this soluble polyimide solution can be applied by printing or spin-coating.

Figure 4:
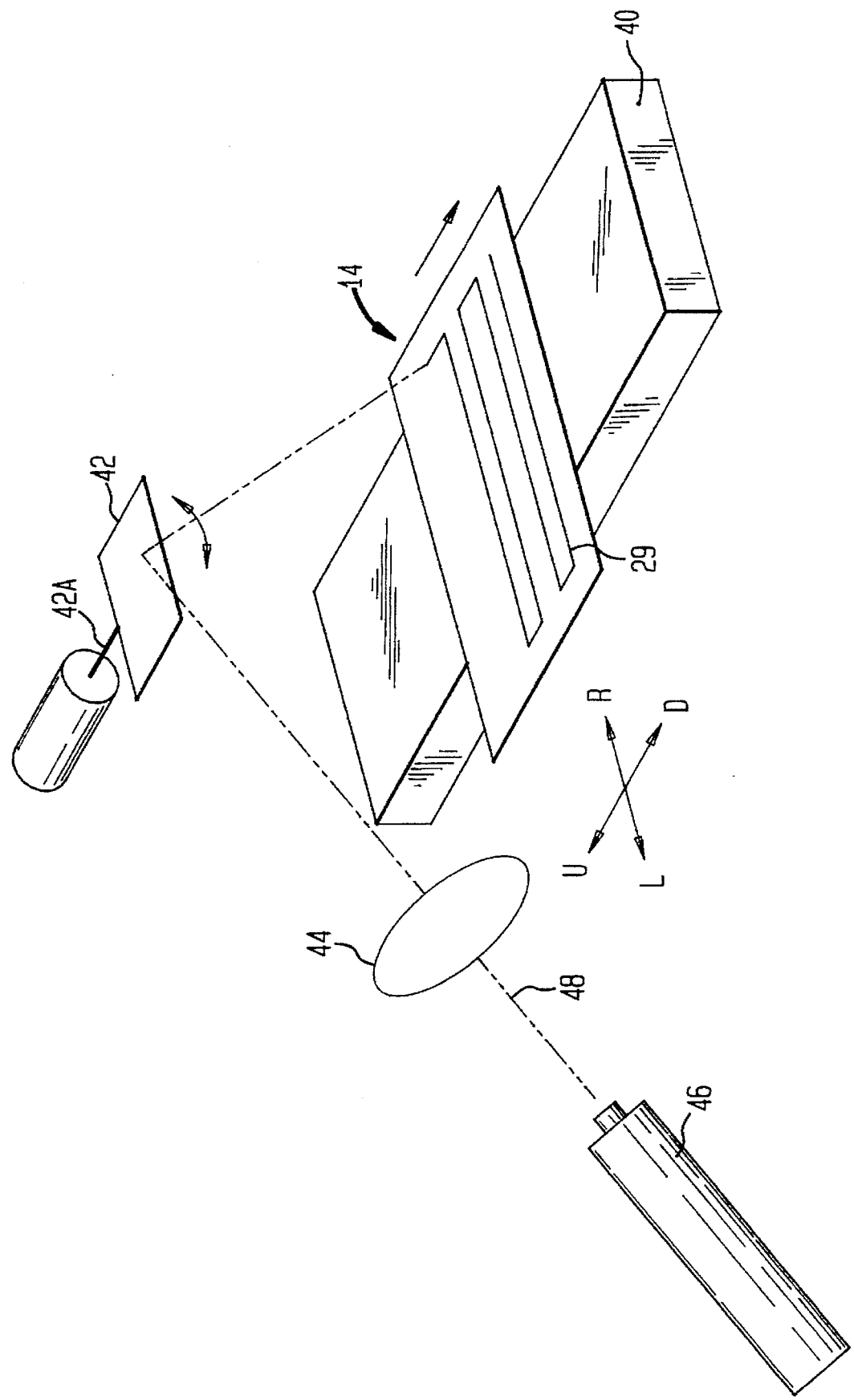
FIG. 4 is a perspective view of the heater using a infrared laser.

Next is the positioning of the TFT substrate 14 at a predetermined location on a movable single-axis stage 40 with the solution application side up, as shown in FIG. 4. A galvano mirror 42 is placed above this movable single-axis stage 40. The rotation axis 42A of the galvano mirror 42 is placed parallel to the travel direction of the movable single-axis stage and an infrared laser transmitter 46 is placed diagonally down the galvano mirror 42 through the lens system 44. The laser beam 48 which is irradiated from the infrared laser transmitter 46 is reflected in the galvano mirror 42 through the lens system and reaches the movable single-axis stage 40. The main scanning is performed by oscillation around the rotation axis 42A of the galvano mirror 42 and subscanning is performed by the step movement of the movable single-axis stage 40, enabling the laser beam 48 to scan two-dimensionally.

Figure 5:
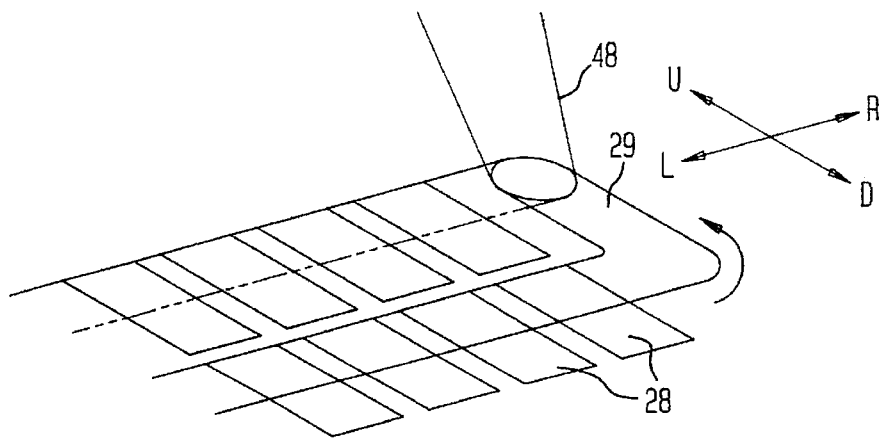
FIG. 5 is a perspective view of the substrate used for explaining the scanning of the laser beam.
Figure 6:
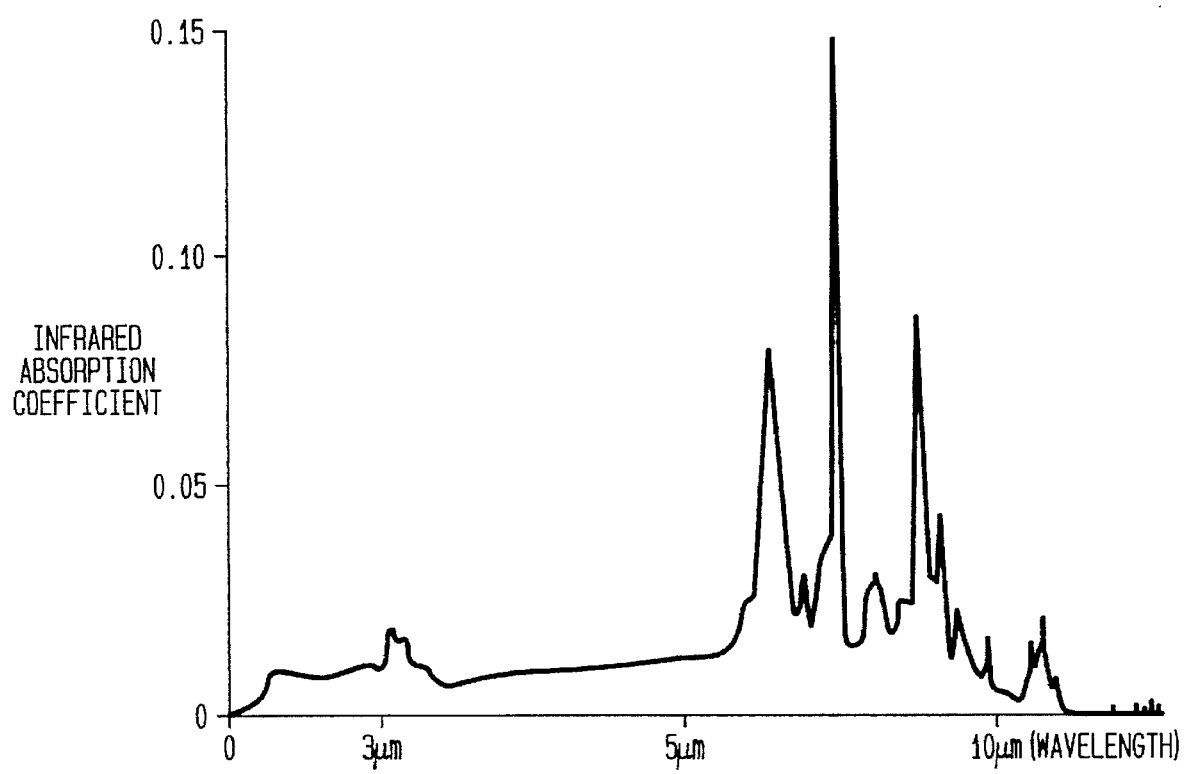
FIG. 6 is a graph showing the infrared absorption coefficient of polyimide.

FIG. 6 shows a typical infrared absorption spectrum graph of polyimide. The absorption occurs in a wide range of 3 μm to 11 μm. There are no wavelength restrictions on the heating source used for heating the soluble polyimide solution, but one having an emission spectrum in the infrared absorption wavelength range is suitable for the heating source. A $CO_2$ laser with an output of 10 W which radiates a laser beam 48 with a wavelength of 10.5 μm is used for the infrared laser transmitter 46 of the embodiment. The beam diameter is throttled by the lens system 44 and, as shown in FIG. 5, on the TFT substrate 14, the beam diameter becomes half (diameter: 100 μm) the dimension in the vertical direction of the pixels 28.

The drives of the movable single-axis stage 40 and the galvano mirror 42 are controlled by the controller (not shown). The predetermined region (region 29 in which the upper halves of the pixels 28 are connected continuously in the lateral direction) of the TFT substrate 14 is scanned in about one second and then infrared rays are radiated to dry the soluble polyimide solution.

A $CO_2$ laser is effective for drying the soluble polyimide solution, but a He-Ne gas laser with a wavelength of 3.39 μm or a He-Xe gas laser with a wavelength of 3.5 μm, etc., can also be used for drying. In addition, if the solution can be dried quickly, the wavelength of the laser beam is not limited to the above values.

After the scanning of the laser beam 48 is completed, leave the TFT substrate 14 at a room temperature (of 24° C., for example) for a specified period of time, for example, until the half of the solvent of the soluble polyimide solution which the laser beam 48 does not irradiate evaporates.

Next, the TFT substrate 14 is heated, if necessary at 180° C. for one hour by a dryer (not shown), e.g., hot plate, to evaporate and remove the solvent completely. Thus, a soluble polyimide orientation film 24 is formed on the TFT substrate 14.

In this way, an orientation film 24 characterized in that the pretilt angle of the molecule 16A of the liquid crystal 16 which is in contact with the upper half of the pixels 28 of the TFT substrate 14 becomes small and the pretilt angle of the molecule 16A of the liquid crystal 16 which is in contact with the lower half of the pixels 28 becomes large can be obtained by quickly drying the upper half of the pixels 28 by using a laser beam 48.

Next, an orientation film 20 is also formed on the color filter substrate 12 similarly to the TFT substrate 14. In the case of the color filter substrate 12, the lower half of the pixels 28 is dried first by the laser beam 48 and then the upper half is dried naturally. In this way, in the color filter substrate 12, the orientation film 20 characterized in that the pretilt angle of the molecule 16A of the liquid crystal 16 which is in contact with the upper half of the pixels 28 becomes small and the pretilt angle of the molecule 16A of the liquid crystal 16 which is in contact with the lower half of the pixels 28 becomes large can be obtained.

Rubbing is performed to the color filter substrate 12 in which the orientation film 20 is formed in this way and to the TFT substrate 14 in which the orientation film 24 is formed so that the molecule is twisted by 90° by splay orientation.

Next, the color filter substrate 12 and the TFT substrate 14 for which rubbing is performed are placed with a predetermined cell gap between them with the orientation film 20 and the orientation film 24 facing each other. Then, the circumference is sealed and the liquid crystal 16 in which a predetermined chiral agent is added is injected in the gap between the two substrates.

Next, polarizers (not shown) are pasted each to the outer surfaces of the color filter substrate 12 and the TFT substrate 14 so that they form a cross polarizer, completing the liquid crystal display 10.

A uniform picture quality with a very wide visual angle can be obtained when the liquid crystal display 10 obtained in this way is driven.

Moreover, in the liquid crystal display 10 according to the invention the electrical characteristics will not become unstable because the orientation films 20 and 24 are formed from a single polyimide.

Since not more than one polyimide is used, the process is simple. Furthermore, since ultraviolet rays are not radiated, stable orientation characteristics can be obtained.

Second Embodiment

The second embodiment will be described with reference to FIGS. 7 to 9. For those parts of the structure identical to the first embodiment, identical symbols are given and explanations are omitted.

Figure 7:
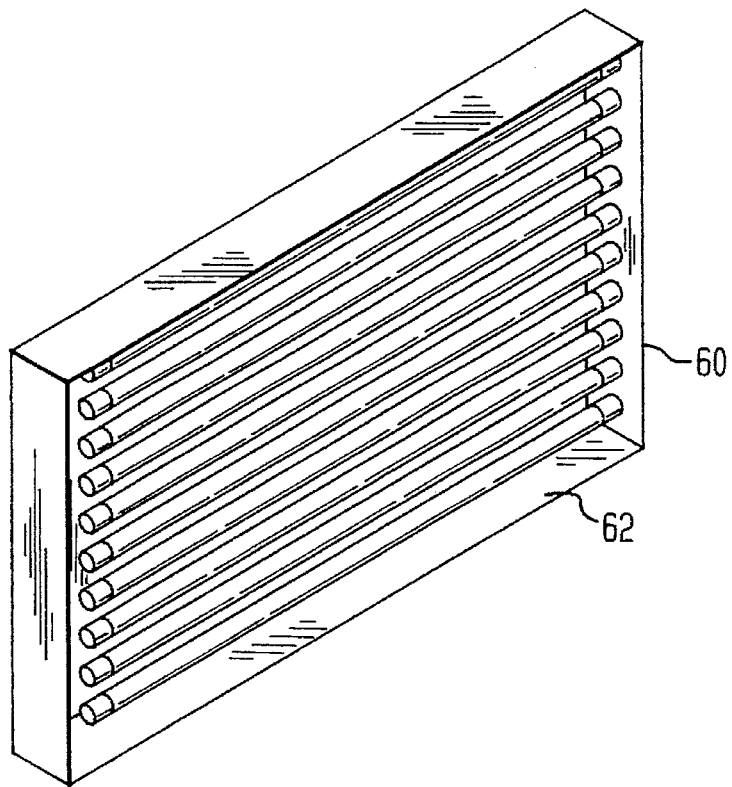
FIG. 7 is a perspective view of the heater.
Figure 8:
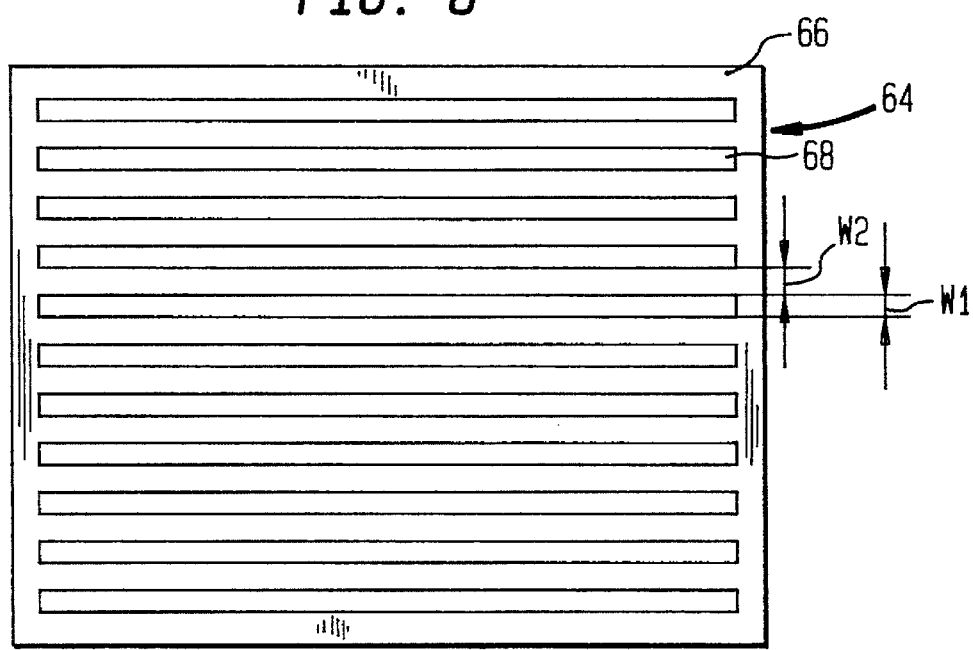
FIG. 8 is a top view of the mask.

In the embodiment, a heater 60 using ten halogen heaters (1000 W) 62, as shown in FIG. 7, and a mask 64, as shown in FIG. 8, are used for the partial drying of the soluble polyimide solution in place of the infrared laser transmitter 46.

On the one hand, the halogen heater 62 of the embodiment is 15 mm in diameter and the length of the stick-like light emitting section is 270 mm.

On the other hand, for the mask 64, the silver 68 for reflecting the infrared rays is coated in an interdigital pattern on the glass substrate 66. Width W1 of the coated silver 68 is 100 μm and interval W2 between the coated silvers is 100 μm.

Figure 9A:
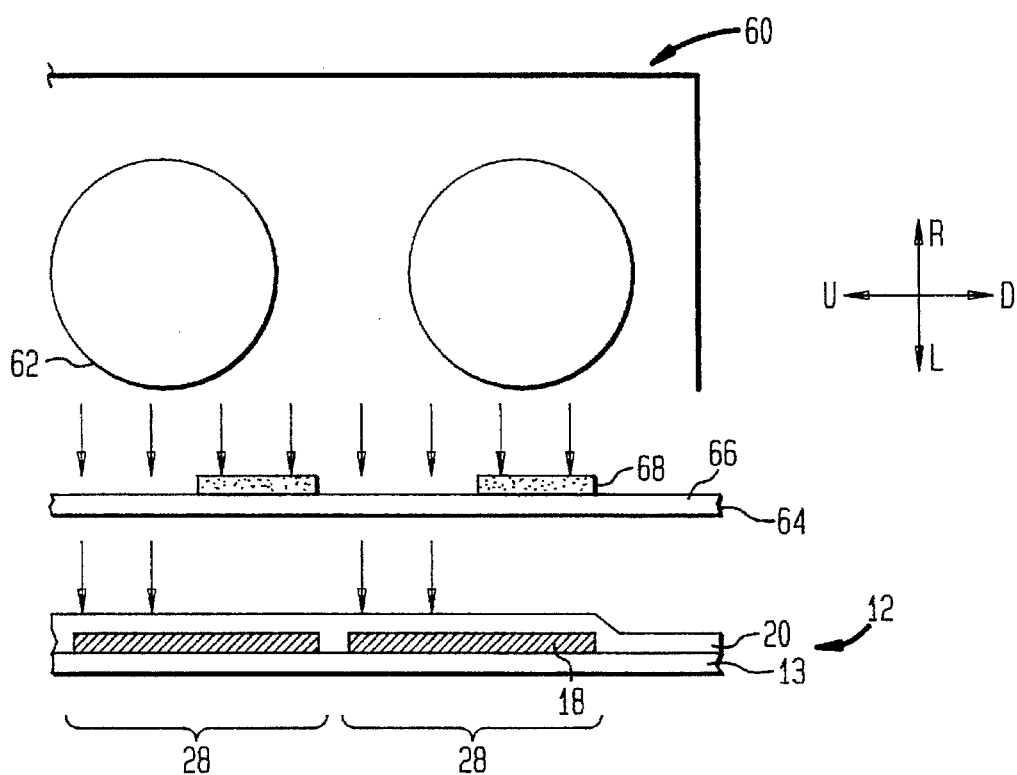
FIG. 9 (A) is a sectional view of the heater, TFT substrate, and mask, showing the location of the mask when the soluble polyimide solution applied to the color filter substrate is dried by heating.
Figure 9B:
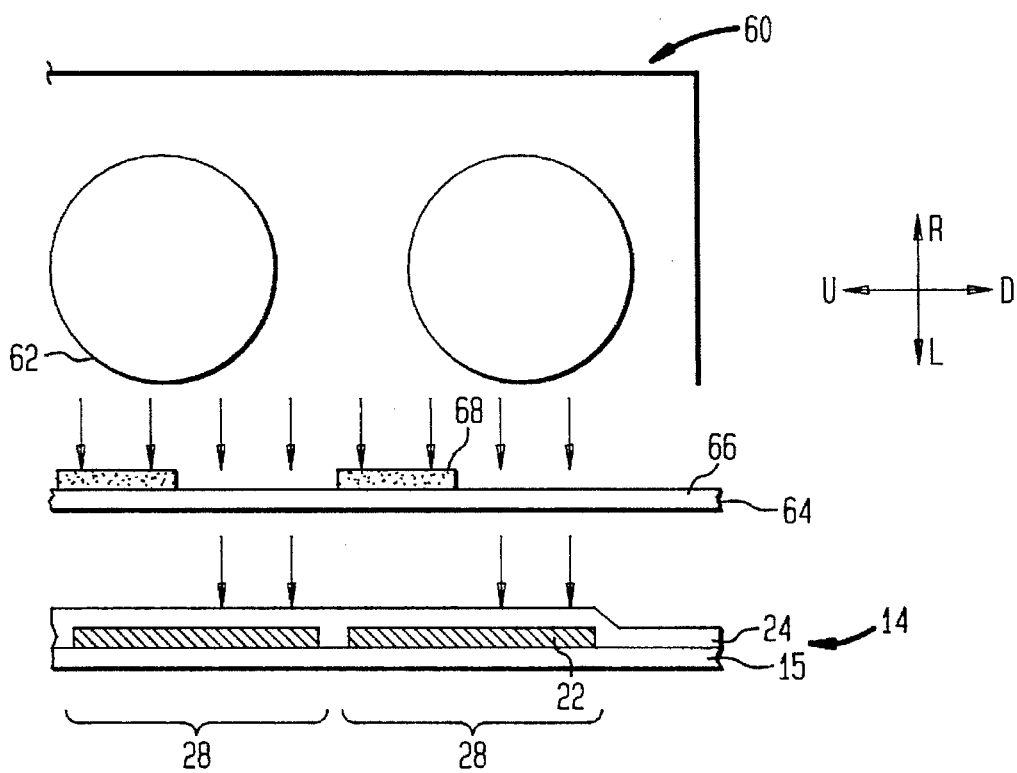
Figure 10:
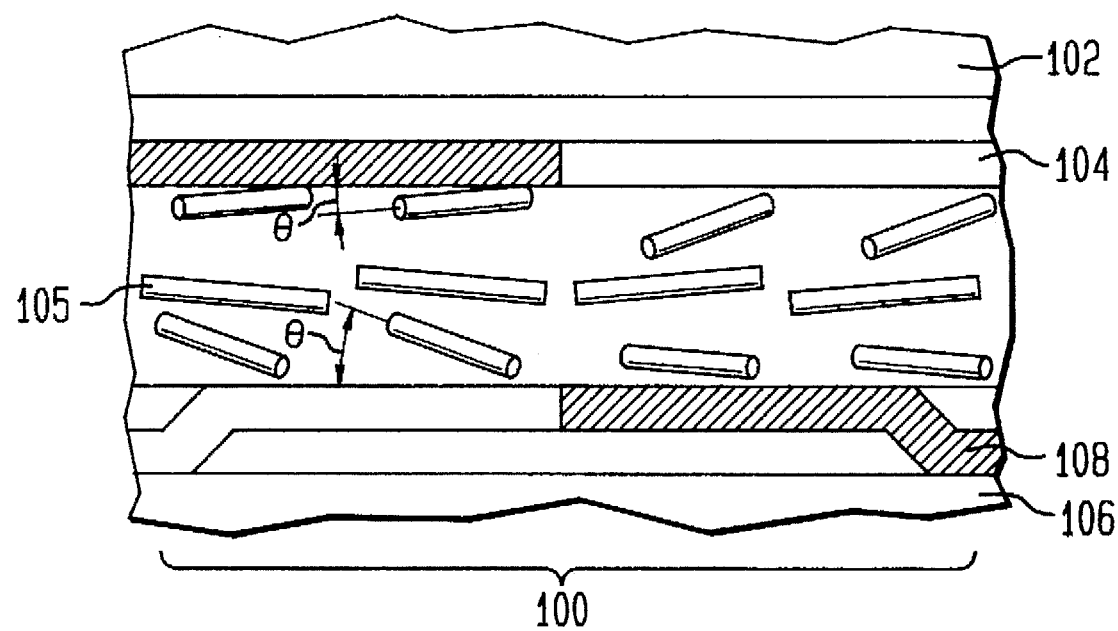
FIG. 10 is a sectional view of a conventional liquid crystal display.

On the one hand, when the soluble polyimide solution applied to the color filter substrate 12 is dried by heating, the mask 64 is placed close to the silver 68 pattern facing the portion to be naturally dried, as shown in FIG. 9 (A). Then, the heater 60 is placed closely on the mask 64 and the infrared rays are irradiated to the color filter substrate 12.

On the other hand, when the soluble polyimide solution applied to the TFT substrate 14 is dried by heating, the mask 64 is placed close to the silver 68 pattern facing the portion to be naturally dried, as shown in FIG. 9 (B). Then, the heater 60 is placed closely on the mask 64 and the infrared rays are radiated onto the color filter substrate 12.

In the embodiment, half of the pixels 28 (the portion corresponding to the transparent section of the mask 64) was able to be dried in about 10 seconds.

The characteristic of the liquid crystal display 10 which is manufactured according to the method of the second embodiment is similar to that of the liquid crystal display 10 which is manufactured according to the method of the first embodiment and a uniform picture quality with a very wide visual angle can be obtained.

Moreover, when the first embodiment and the second embodiment are compared, in the second embodiment, the number of masks 64 required is equal in number corresponding to the number of types of liquid crystal display 10, but in the first embodiment, various types of liquid crystal display 10 can be simply supported by simply changing the drive methods of the movable single-axis stage 40 and the galvano mirror 42.

Moreover, in said embodiment, the pixels 28 were divided into the upper and lower sections and one section was dried by heating and the other section was dried naturally, but it is also acceptable if the pretilt angles in the two divided regions can be made different from each other. It is also acceptable that one section is dried by heating and, after a specified period of time, the remaining section is dried by heating.

Moreover, in said embodiment, the pixels 28 were divided into the upper and lower sections and one section was dried by heating and the other section was dried naturally, but it is also acceptable that the pixels 28 be divided into the right and left sections and one section is dried by heating and the other section is dried naturally. Furthermore, it is also acceptable that the pixels 28 be divided into multiple sections, such as four sections or six sections, and the sections dried by heating and the sections dried naturally are placed alternately. In either case, the color filter substrate 12 and the TFT substrate 14 have to be placed with different pretilt angles facing each other.

In said embodiment, soluble polyimide was used, but the invention is not limited to this. Any type of soluble polyimide can be used if they can have different pretilt angles depending on the heating time (drying time). In addition, a mixture of different types of soluble polyimide can also be used. Moreover, insoluble-polyimide solution can also be used.

As explained above, according to the method for manufacturing a liquid crystal display as set forth in Claim 1, the invention has an advantage of manufacturing a liquid crystal display effectively, which has a wide visual angle.

According to the method for manufacturing a liquid crystal display as set forth in Claim 2, the invention has an advantage of widening the viewing cone.

According to the method for manufacturing a liquid crystal display as set forth in Claim 3, the invention has an advantage of setting the good visual angle symmetrically.

According to the method for manufacturing a liquid crystal display as set forth in Claim 4, even if components not heat-resistant, such as color filters, are attached to the substrate, the invention has the advantage of preventing thermal influence on them because the soluble polyimide can be dried and solidified at a low temperature, e.g., 200° C. or below.

According to the method for manufacturing a liquid crystal display as set forth in Claim 5, the invention has an advantage of supporting different types of liquid crystal displays by simply changing the scanning of the infrared laser beam.

Moreover, according to the method for manufacturing a liquid crystal display as set forth in Claim 6, the invention has an advantage of partially drying the soluble polyimide solution with a simple device using an infrared cutoff mask, a halogen heater, etc.

Those skilled in the art will recognize that a number of changes can be made in the disclosed embodiment without departing from the spirit and scope of the invention. Therefore, it is intended that this shall cover all modifications consistent with the spirit and scope of the claims.

We claim:

1. A method for manufacturing a liquid crystal display, comprising:

applying polyimide, whose effect on the pretilt angle of liquid crystal is varied by heating, to a region corresponding to the pixels on one side of each of a first and a second substrate;

on both said first and second substrates, heating a first portion of said polyimide film applied to the regions corresponding to said pixels at a first temperature and drying said polyimide film in a second portion of said polyimide films applied to the regions corresponding to said pixel other than said first portion at a second temperature which is lower than said first temperature so that the first and second portions are cured at different temperatures;

laminating said first and second substrates together with a space between them with said dried polyimide film sides facing each other; and injecting liquid crystal into the space between said first and second substrates.

2. The method for manufacturing a liquid crystal display as set forth in claim 1, wherein the two substrates are laminated with the polyimide film in said first portion on said first substrate and the polyimide film in the second substrate facing each other, and said first and second temperatures are used for making the difference in the pretilt angle between both substrates of said injected liquid crystal between 2° and 10°.

3. The method for manufacturing a liquid crystal display as set forth in claim 1, wherein said first and second portions are each a different half of the region corresponding to said pixels.

4. The method for manufacturing a liquid crystal display as set forth in claim 1, wherein said polyimide is a soluble polyimide.

5. The method for manufacturing a liquid crystal display as set forth in claim 1, wherein said heating is conducted by two-dimensionally scanning the polyimide with an infrared laser beam.

6. The method for manufacturing a liquid crystal display as set forth in claim 1, wherein said heating is conducted by irradiating infrared rays onto the sides of said first and second substrates containing said polyimide film and an infrared cutoff mask is situated on the infrared incoming direction of the nonheated area of said polyimide film to cut off said infrared rays.

7. In the fabrication of a liquid crystal display screen containing a plurality of display pixels, the method comprising:

a) applying polyimide films, whose effect on the tilt angle of liquid crystal varies with the films curing temperature, as orientation films for the liquid crystal display to two substrates;

b) curing each of the polyimide films at different temperatures in different parts of the area defining each pixel;

c) laminating said first and second substrates together to provide an encapsulated space containing the two polyimide films facing each other with the parts of one of the polyimide films cured at a higher temperature facing the parts of the other film cured at a lower temperature so that the two different parts of the area defining each pixel have orientation films with different curing rate configurations;

d) filling the encapsulated space with a liquid crystal material whereby the tilt angle of the liquid crystal is different in the two parts of the area defining each pixel to increase the viewing cone of the screen.

* * * * *